(12) United States Patent
Leeson et al.

(10) Patent No.: US 12,409,009 B2
(45) Date of Patent: Sep. 9, 2025

(54) DENTAL APPLIANCE AND METHOD FOR MAKING THE SAME

(71) Applicant: James R. Glidewell Dental Ceramics, Inc., Newport Beach, CA (US)

(72) Inventors: David Christopher Leeson, North Tustin, CA (US); Michael J. Selberis, Coto de Caza, CA (US); Sergey Nikolskiy, Coto de Caza, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

(21) Appl. No.: 18/753,681

(22) Filed: Jun. 25, 2024

(65) Prior Publication Data

US 2024/0341918 A1    Oct. 17, 2024

Related U.S. Application Data

(62) Division of application No. 16/776,761, filed on Jan. 30, 2020, now Pat. No. 12,023,214.

(51) Int. Cl.
| | |
|---|---|
| *A61C 5/20* | (2017.01) |
| *A61C 7/00* | (2006.01) |
| *A61C 7/08* | (2006.01) |
| *A61C 7/16* | (2006.01) |
| *A61C 13/00* | (2006.01) |
| *A61C 13/271* | (2006.01) |
| *B29C 64/393* | (2017.01) |
| *B33Y 50/02* | (2015.01) |
| *B33Y 80/00* | (2015.01) |
| *B29L 31/00* | (2006.01) |

(52) U.S. Cl.
CPC ............ *A61C 5/20* (2017.02); *A61C 7/002* (2013.01); *A61C 7/08* (2013.01); *A61C 7/16* (2013.01); *A61C 13/0013* (2013.01); *A61C 13/26* (2013.01); *B29C 64/393* (2017.08); *B33Y 50/02* (2014.12); *B33Y 80/00* (2014.12); *B29L 2031/753* (2013.01)

(58) Field of Classification Search
CPC ................. A61C 7/08; A61C 13/00
See application file for complete search history.

(56) References Cited

U.S. PATENT DOCUMENTS

| | | |
|---|---|---|
| 3,763,564 A | 10/1973 | Petrelli et al. |
| 4,591,341 A | 5/1986 | Andrews |
| 5,203,695 A | 4/1993 | Bergersen |
| 5,324,198 A | 6/1994 | Hazen |
| 5,975,893 A | 11/1999 | Chishti et al. |
| 6,178,967 B1 | 1/2001 | Barnes |
| 6,705,863 B2 | 3/2004 | Phan et al. |
| 7,168,950 B2 | 1/2007 | Cinader |
| 7,175,427 B2 | 2/2007 | Smith |
| 7,458,810 B2 * | 12/2008 | Bergersen .............. B33Y 80/00 433/6 |
| 8,936,463 B2 | 1/2015 | Mason et al. |

(Continued)

*Primary Examiner* — Jacob J Cigna
(74) *Attorney, Agent, or Firm* — Klarquist Sparkman, LLP

(57) ABSTRACT

Disclosed are example embodiments of methods and systems for improving teeth appearance and repositioning of the teeth. One of the systems is an appliance that includes: an outer shell with simulated teeth that approximate a final teeth arrangement; and inner cavities configured to receive a patient's teeth and to incrementally reposition the teeth toward the final teeth arrangement.

16 Claims, 18 Drawing Sheets

(56) References Cited

U.S. PATENT DOCUMENTS

| | | | |
|---|---|---|---|
| 9,161,823 B2 * | 10/2015 | Morton | G06F 30/00 |
| 9,539,071 B2 | 1/2017 | Traub et al. | |
| 9,707,054 B2 * | 7/2017 | Chishti | A61C 9/0046 |
| 9,901,429 B2 | 2/2018 | Liechtung et al. | |
| 9,939,999 B2 | 4/2018 | Wen et al. | |
| 10,201,409 B2 | 2/2019 | Mason | |
| 10,265,141 B2 | 4/2019 | Mason et al. | |
| 10,524,881 B2 | 1/2020 | Li et al. | |
| 11,266,484 B2 | 3/2022 | Mason et al. | |
| 2001/0036618 A1 | 11/2001 | Worthington | |
| 2002/0150864 A1 | 10/2002 | Zilberman | |
| 2003/0008259 A1 | 1/2003 | Kuo et al. | |
| 2008/0044786 A1 | 2/2008 | Kalili | |
| 2013/0323665 A1 | 12/2013 | Dinh | |
| 2014/0142897 A1 | 5/2014 | Kuo | |
| 2017/0367791 A1 | 12/2017 | Raby et al. | |

\* cited by examiner

DENTAL APPLIANCE AND METHOD FOR MAKING THE SAME

CROSS-REFERENCE TO RELATED APPLICATIONS

This application is a divisional of and claims the benefit of, and priority to, U.S. patent application Ser. No. 16/776,761, filed Jan. 30, 2020, the entirety of which application is incorporated herein by reference.

TECHNICAL FIELD

The disclosure relates generally to the field of dental appliances, specifically and not by way of limitation, some embodiments are related to a dental appliance that provides both esthetic and orthodontics functions

BACKGROUND

The use of braces is a common way to correct dentition defects (e.g., gap, chipped tooth) and malocclusion (e.g. overbite, crossbite) of a patient. Braces typically have a variety of implements such as archwires, ligatures, brackets, and O-rings. Not only braces can be unsightly, they require many frequent and long visits to the dental office. This is because braces need to be check and adjusted regularly in order to ensure that the archwire, for example, is providing a sufficient amount of force to slowly reposition one or more teeth. Further, the accuracy with which orthodontic brackets are positioned on the teeth can largely determine the quality of outcome. Any positioning mistake can be corrected by adjusting the archwires, ligatures, and/or brackets, for example, which can be a time-consuming process.

Another way to correct malocclusions is through the use of clear aligners, which are orthodontic devices that are a transparent, plastic form of dental braces used to adjust teeth. To correct malocclusions, the patient is required to wear a series of clear aligners over a long span of time (e.g., months to years) in accordance with a treatment plan. Each clear aligner in the series of aligners is designed to slowly reposition the patient's teeth toward the desired outcome. Visits to the dental office for patients with clear aligners are less frequent and quicker as compared to visits for patients with braces. With clear aligners, in the best-case scenario, the dentist only needs to determine whether the teeth have sufficiently moved for the next set of clear aligners in the series. If the teeth have sufficiently moved for the next set of clear aligners, the patient can be quickly sent home with the next clear aligner to wear for the next several weeks or months. Typically, patients are sent home with multiple aligners between appointments. This process is repeated until the last set of clear aligners is worn. A typical treatment plan can require 20 to 35 incremental clear aligners, depending upon the severity of the malocclusions. Certain malocclusions can require a series of 50+ aligners.

Clear aligners have a couple of major drawbacks. One, they must be removed before eating as aligners are typically thin and lack the required compliance and geometry for chewing. Specifically, the occlusal surfaces of the aligners are generally blunt and are not suitable for chewing. The other major drawback is that aligners can be esthetic ally unpleasant. Particularly, when they are opaque. Even though some aligners can be made transparent using translucent materials, aligners do not have external dentition features to enhance the appearance patient's teeth during the long treatment process. To immediately improve the appearance of the patient's teeth, the patient would need to use a different product that is specifically made for improving the esthetic of a person's teeth. However, this type of appliances is for esthetic purposes only as it does not have any orthodontic functionalities. Esthetic-providing appliances are designed to cover up malocclusions with a set of simulated teeth. Today, patients must use two different products to have both orthodontic and esthetic functions.

SUMMARY

Disclosed are example embodiments of methods and systems for improving teeth appearance and repositioning of the teeth. One of the systems is an appliance that includes: an outer shell with simulated teeth that approximate a final teeth arrangement; and inner cavities configured to receive a patient's teeth and to incrementally reposition the teeth toward the final teeth arrangement.

The final teeth arrangement can be a teeth arrangement that approximate the appearance of teeth at a final stage of the patient's treatment plan. The final teeth arrangement can also be the position and geometry of the teeth at the end of the treatment plan. The final teeth arrangement can be a teeth arrangement that approximate the appearance of teeth at any stage of the patient's treatment plan such as an intermediate stage. The final teeth arrangement can also be a teeth arrangement where there is no visible dentition defect or an arrangement that is less than ideal—an esthetic imperfection. Additionally, the final teeth arrangement can be a teeth arrangement that is specifically designed for fitting a veneer or other single or multi-unit restoration. The inner cavities can include a plurality of anchoring slots configured to receive corresponding anchors on the patient's teeth. Additionally, the appliance can include one or more occlusal windows configured to expose an occlusal surface of one or more teeth.

The outer shell of the appliance can include one or more areas having varying thicknesses designed to compensate for dentition defects, add to the structural integrity of the appliance, and/or replicate real teeth geometry (e.g., occlusal surface) for chewing functionality. A dentition defect can be an esthetic imperfection.

The outer shell can include one or more simulated teeth having varying thickness within a tooth to compensate for a dentition defect or an anchor on the tooth. The outer shell can also include one or more simulated teeth with an occlusal surface that comprises one or more cusps, grooves, fossa, or ridges. The inner cavities of the appliance can include one or more under-hook features to partially mate with an anchor on a tooth. The inner cavities can also be designed to apply certain forces to the teeth in order to correct for misalignments or malocclusions of the teeth.

Also disclosed is a method for manufacturing a dental appliance for improving teeth appearance and repositioning of the teeth. The method includes: receiving a scan dentition data of a patient; designing an appliance model with inner cavities that approximate the patient's dentition based on the scan dentition data; modifying the inner cavities of the appliance model to incrementally reposition the patient's teeth based on a treatment plan generated using the scan dentition data; modifying an outer shell of the appliance model to have simulated teeth that approximate a desired teeth arrangement; and fabricating the appliance using additive manufacturing (e.g., 3D printing) based on the designed appliance model.

In modifying the digital model of the inner cavities, a plurality of anchoring slots can be created in the inner cavities to receive corresponding anchors on the patient's teeth. The digital model of the appliance can also be modified to include one or more occlusal openings configured to expose an occlusal surface of one or more teeth. Additionally, the outer shell can be modified by creating one or more areas having varying thicknesses to compensate for one or more dentition defects, replicate real teeth geometry (e.g., occlusal surface) for chewing functionality, and/or to fortify the structure of the appliance, particularly where anchoring brackets/buttons are located. For example, the outer shell can be modified with geometry to exert a force on the patient's teeth in order to move the teeth to the desired positions and/or shape.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1:
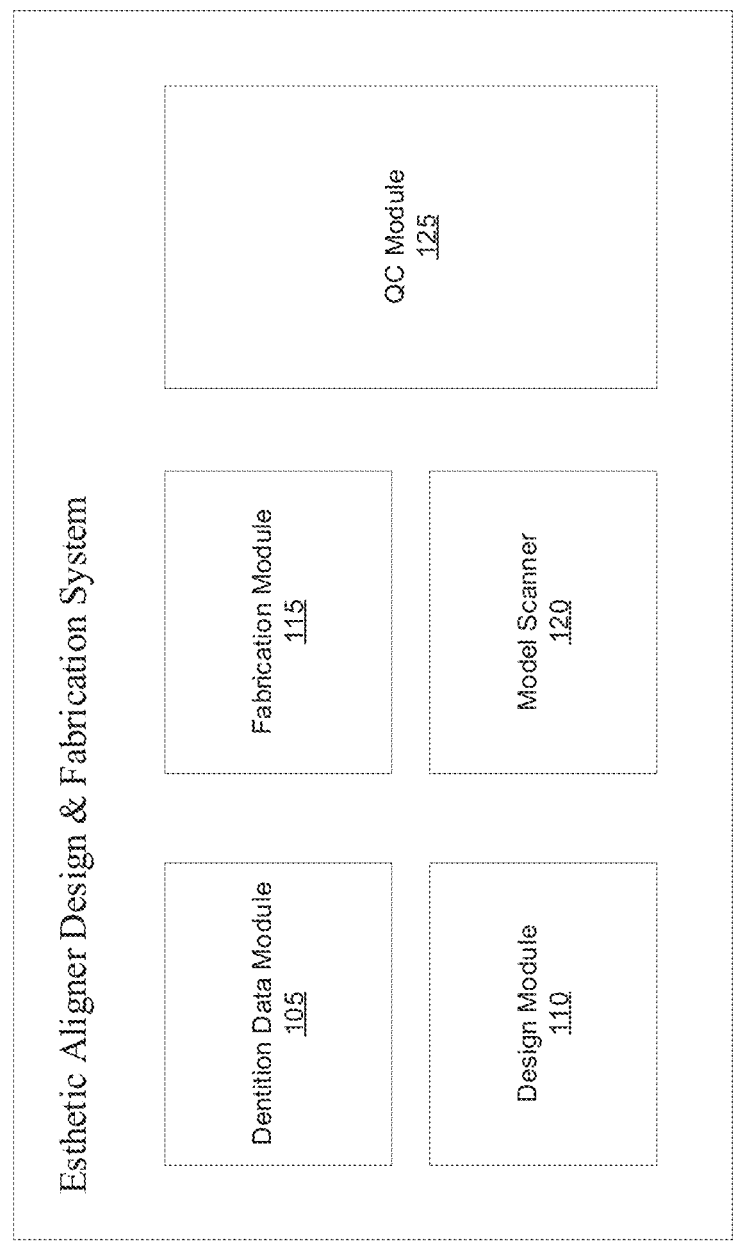
FIG. 1 is a high-level block diagram of esthetic aligner design and fabrication system in accordance with some embodiments of the present disclosure.

In the following description, for purposes of explanation, numerous specific details are set forth to provide a thorough understanding of the invention. However, it will be apparent to one skilled in the art that the invention can be practiced without these specific details. In other instances, structures and devices are shown in a block diagram form in order to avoid obscuring the invention.

Overview

Conventional aligners are thin and are mostly made from a transparent polymeric material. Each aligner has inner cavities that are designed, using the patient's dentition data, such that a small force is constantly applied on the patient's teeth and thereby slowing moving (e.g., translating and/or rotating) them over a long period of time. In a typical treatment plan, a patient can have 20 or more aligners, each aligner incrementally moves the teeth toward the desired outcome. Once the treatment plan is completed over a span of several weeks, months, or even years, the patient's teeth with have been transformed by the series of aligners from a state with many malocclusions to a state with little to no malocclusion. However, during the long period of treatment, the patient must endure an extended period of unpleasant looking teeth as aligners do not have any esthetic function.

Conventionally, the series of aligners is produced by first producing a positive solid model of the patient's current dentition. This is the patient's starting model that includes all of the malocclusions in the patient's dentition. The starting model can be formed using an impression model that is generated with a dental impression. With the starting model, the series of aligner models can be designed by modifying the starting model and subsequent aligner models incrementally. For example, the first aligner model can be designed by modifying the starting model. The second aligner model can be designed by modifying the first aligner model. And the third aligner model can be designed by modifying the second aligner model and so forth. This progression of design continues until the final aligner model is generated. For each aligner, the inner cavities are designed and constructed such that when worn by the patient the inner cavities would impart a small movement (e.g., translation, rotation, or a combination thereof) on the patient's dentition.

Once the series of aligner (physical) models are generated, aligners can be fabricated using thermoforming with the series of aligner models to function as a mold. Thermoforming is a process that vacuums a pre-heated sheet of polymeric material onto a mold. For conventional aligners, a polymeric sheet is vacuumed onto an aligner mold (e.g., the first aligner mold). The combination of the strong vacuum on the mold side and high air pressure on the polymeric side pushes the elastic polymeric material onto the mold and causes the polymeric material to take the shape of the mold. The thermoforming process is effective in producing aligners. However, the thickness of the aligner can only be controlled globally. In other words, the overall thickness of a thermoformed aligner can be controlled by using a thicker polymeric sheet and pressure exposure time. However, the thermoforming process cannot vary the thickness on a local scale (e.g., tooth size or smaller). For example, the thermoforming process cannot vary the thickness within a single tooth or a small localized area such as the mesial or distal surface area of a tooth.

Conventional esthetic appliances are fabricated in a similar way. They can be fabricated using a thermoforming, casting, or milling process. However, esthetic appliances are used only for an esthetic purpose, which is to hide malocclusions. Esthetic appliances hide malocclusions by hiding them behind a set of simulated teeth. The inner cavities of an esthetic appliance are only designed to tightly fit onto the patient's natural teeth and are not designed to impart any movement on the patient's dentition. In order for a patient to have the benefits of both the aligner and the esthetic appliances, the patient must use both products separately as one does not have the functionalities of the other.

The disclosed esthetic alignment appliance or esthetic aligner is designed to provide both orthodontic and esthetic functionalities. One of the ways to design both orthodontic and esthetic functionalities into esthetic aligners is through the strategic application of local thickness variation at or near the proximity of anchor points and/or malocclusions. An example of local thickness variation is the thickness variation occurring between the facial and buccal side of a tooth. Another example of local thickness variation is the thickness variation occurring between the mesial and distal side of a tooth. For instance, to compensate for a gap on the mesial side, the thickness of the tooth on the mesial side can be greatly increased in order to fill in the gap while the thickness of the tooth on the distal side can remain in a normal range. In another example, the thickness can be increased at an anchor point in order to fortify the structural integrity of the appliance around the anchor point such that a desirable amount of force (e.g., translational and/or rotational) can be applied to the tooth.

The disclosed methods for manufacturing the esthetic aligner use an additive manufacturing (e.g., 3D printing) process to tightly control and manipulate the physical dimensions (e.g., wall thickness) of the esthetic aligner. Unlike the thermoforming process, the additive manufacturing process enables designers of the esthetic aligner to have full control of the overall and local thicknesses of the shell wall of the esthetic aligner. This enables the designers to plan and construct the inner cavities of an esthetic aligner to have orthodontic functions and the outer shell of the esthetic aligner to have simulated teeth that approximate the final arrangement of the patient's teeth in accordance with a treatment plan.

There are many additive manufacturing processes and techniques known in the art, several of which are suitable for manufacturing the appliances described herein. As used herein, the term "additive manufacturing" generally refers to processes by which digital three-dimensional (3D) design data is used to build up a component in layers by depositing material. There are several categories of additive manufacturing processes, including vat photopolymerisation (e.g., stereolithography (SLA), digital light processing (DLP), digital light synthesis (DLS), continuous liquid interface producting (CLIP), or generically "3D printing"), material jetting, binder jetting, material extrusion (e.g., fuse deposition modelling (FDM)), powder bed fusion (e.g., direct metal laser sintering (DMLS), electron beam melting (EBM), selective heat sintering (SHS), selective laser melting (SLM), and selective laser sintering (SLS)), sheet lamination (e.g., ultrasonic additive manufacturing (UAM) and laminated object manufacturing (LOM)), and directed energy deposition. Of the foregoing, the additive manufacturing processes used herein are those that are suitable for additive manufacturing using polymeric materials used to manufacture the esthetic aligner appliances described herein.

The appliances described herein typically comprise polymeric materials, including thermoplastic polymers, thermoset polymers, and other materials having the material properties suitable for the esthetic aligner appliances described herein. A comprehensive description of the materials suitable for this purpose is beyond the scope of the present disclosure and will not be undertaken here. Without intending to be limiting, examples of such materials are described in the following patents and publications, the portions of each of which that describe additive manufacturable materials is hereby incorporated by reference in its entirety: U.S. Pat. No. 10,495,9973, entitled "3D Printed Composites from a Single Resin by Patterned Light Exposures;" U.S. Pat. No. 10,492,888, entitled "Dental Materials Using Thermoset Polymers;" United States Patent Application Publication No. 2019/0338067, entitled "Curable Composition for use in a High Temperature Lithography-Based Photopolymerization Process and Method of Producing Crosslinked Polymers Therefrom."

Additionally, engineers can use two or more materials to design and fabricate the esthetic aligner and take advantage of different material properties. For example, a stronger polymeric material can be used to additively manufacture the wall of the inner cavities while a more esthetically pleasing and easier-to-clean material can be used to additively manufacture the outer shell. With certain additive manufacturing processes, the esthetic aligner can be fabricated as one integrated piece using two or more materials. For example, the esthetic aligner can be fabricated with one or more materials using a polyjet 3D printing process. The esthetic aligner can also be printed over an existing mold.

The polyjet 3D printing process allows blends of materials to be used such that the modulus of the blended material can be locally modified to create improved stiffness and/or improved tooth movement. This cannot be accomplished with conventional milled or thermoformed aligners.

Esthetic Aligner Design & Fabrication System

FIG. 1 is a block diagram illustrating an example esthetic aligner design and fabrication system 100 in accordance with some embodiments of the present disclosure. System 100 includes a dentition module 105, a design module 110, a fabrication module 115, a model scanner 120, and a QC module 125. Dentition data module 105 can include a dentition database and a dentition scanner. The dentition scanner can be an intraoral scanner that directly scan a patient's dentition and generate a dentition data set that is eventually stored by the dentition database. A patient's dentition data set can also be generated by merging two or more scans of the patient's dental impressions. One or more impressions of a patient's dentition can be taken, and one or more scans can be performed on each impression. The final or merged dentition data set can be generated by using a best-fitting algorithm to merge data from the one or more dental impression scans.

Design module 110 can include a computer system and software that enable aligner designers to take a patient's dentition data set to create a series of digital esthetic aligner models in accordance with a treatment plan. Each digital esthetic aligner model is designed to incrementally move the patient's teeth toward a final arrangement as planned by the patient's orthodontist. Each digital esthetic aligner is designed with inner cavities configured to incrementally move the patient's teeth to an intermediate stage, which in turn will be incrementally moved by the next esthetic aligner in the series until the very last esthetic aligner in the series is reached.

To design the first digital esthetic aligner model in the series of digital esthetic aligner model for a patient, the aligner designer can modify the patient's scan dentition data to construct inner cavities of the first esthetic aligner such that they would impart some movement on one or more teeth when worn by the patient. The designer can also use the patient's scan dentition data to generate a set of simulated teeth on the outer shell such that they best match with the patient's dentition. Some of the simulated teeth can have the same dentition features as some of the patient's teeth. Once the first esthetic aligner model is generated, it can be used to fabricate the first esthetic aligner (i.e., the physical model) using an additive manufacturing fabrication system (e.g., a 3D printer).

Next, the designer can use design module 110 to generate the second digital esthetic aligner model of using the first digital esthetic aligner model as a starting point. At this stage, the designer would slightly adjust the inner cavities of the first esthetic aligner model such that the inner cavities of the second esthetic aligner model would further move the patient's teeth toward the next intermediate stage, which in turn will be incrementally moved by the next (third) esthetic aligner in the series until the very last esthetic aligner in the series is reached.

Fabrication module 115 can fabricate, using an additive manufacturing (e.g., 3D printing) process, a series of esthetic aligners based at least on the series digital esthetic aligner models generated by design model 110. In one embodiment, the fabrication module 115 can be a 3D printing system such as, but not limited to, a stereolithography (SLA) 3D printer or a digital light processing (DLP) 3D printer. The 3D printing material used can be a photopolymer, methacrylate-based polymer, ester-based polymer, ABS plastic, thermal plastic, acrylic esters, or other medical grade materials, including those described in the references discussed above and incorporated herein by reference.

System 100 can optionally include model scanner 120 and QC module 125. Model scanner 120 can scan each fabricated esthetic aligner to generate a digital model of the fabricated esthetic aligner. Next, QC module 125 can compare the scanned digital model of the fabricated esthetic aligner with the corresponding digital esthetic aligner model (produced by design module 110) to generate a differences model. Quality control can be performed by employing statistics on the differences model. QC module 125 can determine whether the fabricated esthetic aligner is a good or defective part based on the distribution of offsets of the differences model, which can comprise of data points of offset values. An offset is determined by the difference in distance between a point in the scanned digital model of the fabricated esthetic aligner data and the corresponding best-fitting point in the digital esthetic aligner model. For a perfect match, the offset value is zero.

For example, the fabricated esthetic model can be deemed to be a good part of the distribution of data points of the difference model follows a normal distribution. If the data distribution has an offset peak or multiple peaks, then the fabricated esthetic model can be flagged as a bad part.

QC module 125 can also scan each layer of materials as it is being deposited in real-time and compare it to the digital model of the layer being scanned. If the differences between the scanned layer and the digital model is above a certain threshold, the additive manufacturing process can be halt or the part flagged.

Esthetic Alignment Appliance

Figure 2:
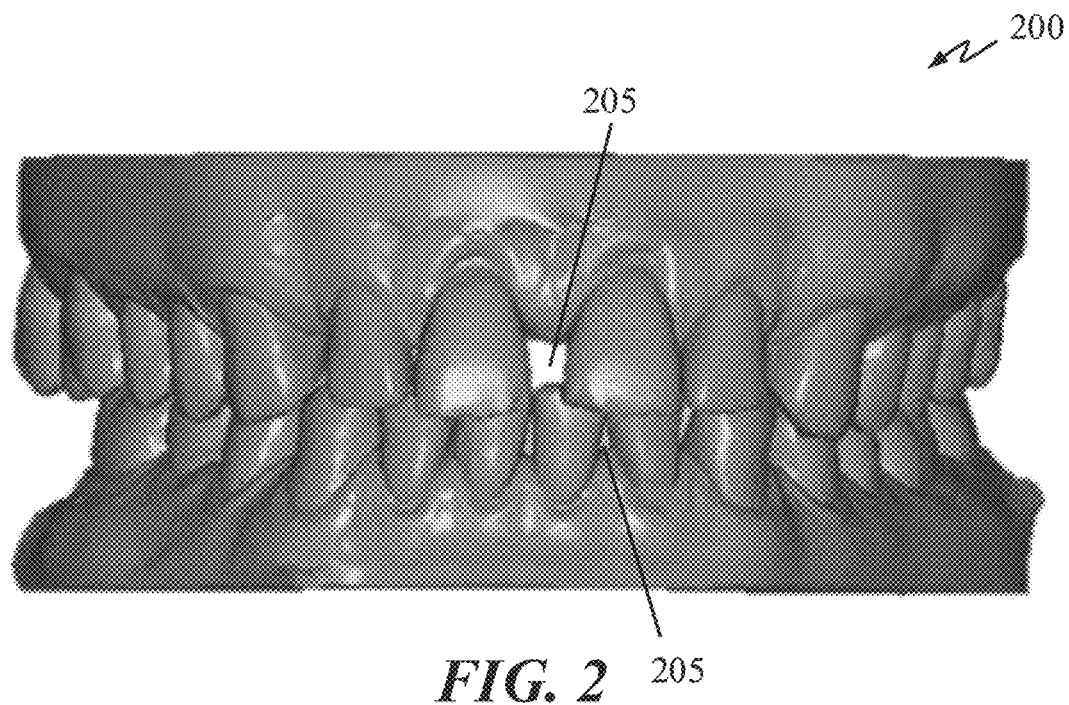
FIG. 2 is a front view of a digital model of the patient's dentition.
Figure 3:
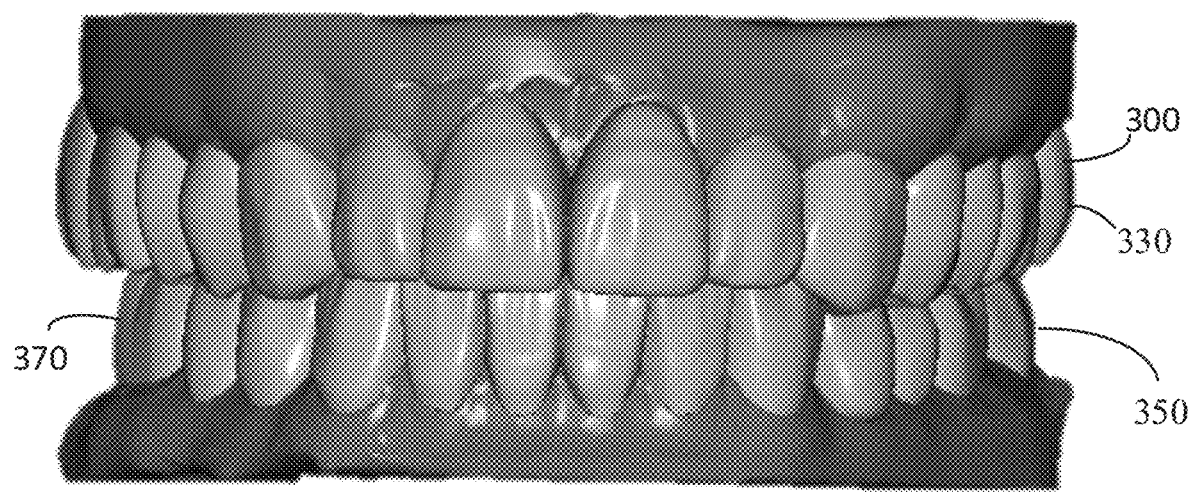
FIG. 3 is a front view of a digital model of upper and lower esthetic aligners (as being worn) in accordance with some embodiments of the present disclosure.
Figure 4:
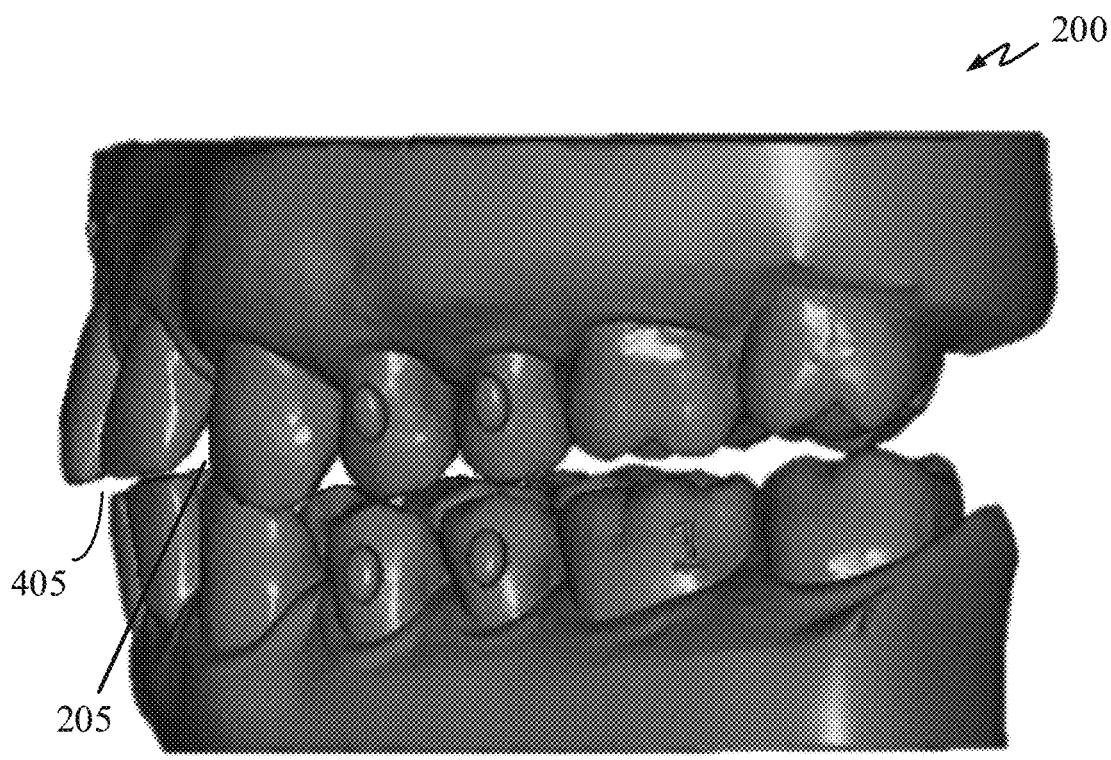
FIG. 4 is a side view of the digital model of the patient's dentition as shown in FIG. 2.
Figure 5:
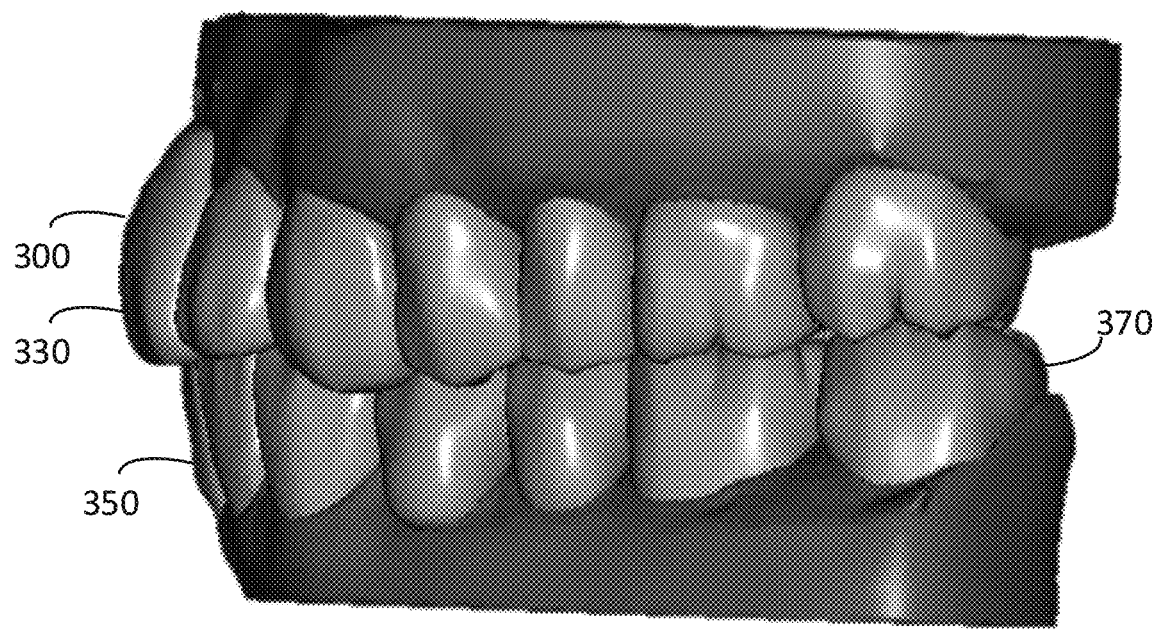
FIG. 5 is a side view of the digital model of upper and lower esthetic aligners (as being worn) in accordance with some embodiments of the present disclosure.

FIGS. 2-5 will now be discussed concurrently. FIG. 2 is a frontal view of a dentition model 200 generated using a patient's scan dentition data having multiple malocclusions such as gaps 205, overbites, and misalignments. FIG. 3 is a frontal view of an upper esthetic aligner 300 and a lower esthetic aligner 350 (being worn) that were fabricated based on the patient's scan dentition data. FIG. 4 is a side view of dentition model 200. FIG. 5 is a side view of upper esthetic aligner 300 and a lower esthetic aligner 350. Gaps 205 and overbites 405 can easily be seen in FIG. 4 as shown.

Esthetic aligners 300 and 350 are shown as worn by a patient. Esthetic aligners 300 and 350 both include a set of simulated teeth that approximate the final teeth arrangement of the patient. Esthetic aligners 300 and 350 can be the first set of a series of esthetic aligners or they can be the penultimate or very last set in the series of esthetic aligners. This is the key advantage of the disclosed esthetic aligners. The patient can be at any stage of the treatment plan, but from a third person's perspective, the patient's teeth appears as if they are perfect (without any malocclusion). In other words, both esthetic aligners 300 and 350 can have a visually appealing set of simulated teeth on outer layers 330 and 370 while having vast different inner cavities designed to fit with the patient's current dentition that includes all of the malocclusions. The inner cavities are designed to incrementally move the patient's real teeth toward a desired final arrangement. As shown in FIGS. 3 and 5, malocclusions such as gaps 205 are no longer present.

Referring now to FIG. 5, upper esthetic aligner 300 includes outer shell/layer 330 with a set of simulated teeth for the upper jaw. Similarly, lower esthetic aligner 350 includes outer layer shell 370 with another set of simulated teeth for the lower jaw. Esthetic aligners 300 and 350 include inner cavities (hidden behind the outer layer) that are designed to receive the patient's teeth on the upper and lower jaw, respectively. The simulated teeth on the outer shell of each esthetic aligner can be configured to approximate the patient's teeth at a certain stage of the treatment plan. In some embodiments, the simulated teeth approximate the teeth final arrangement of the patient's treatment plan. Alternatively, the simulated teeth can approximate teeth at any intermediate stage of the treatment plan. This can be desirable under certain circumstances to avoid abrupt changes of the patient's appearance.

Figure 6:
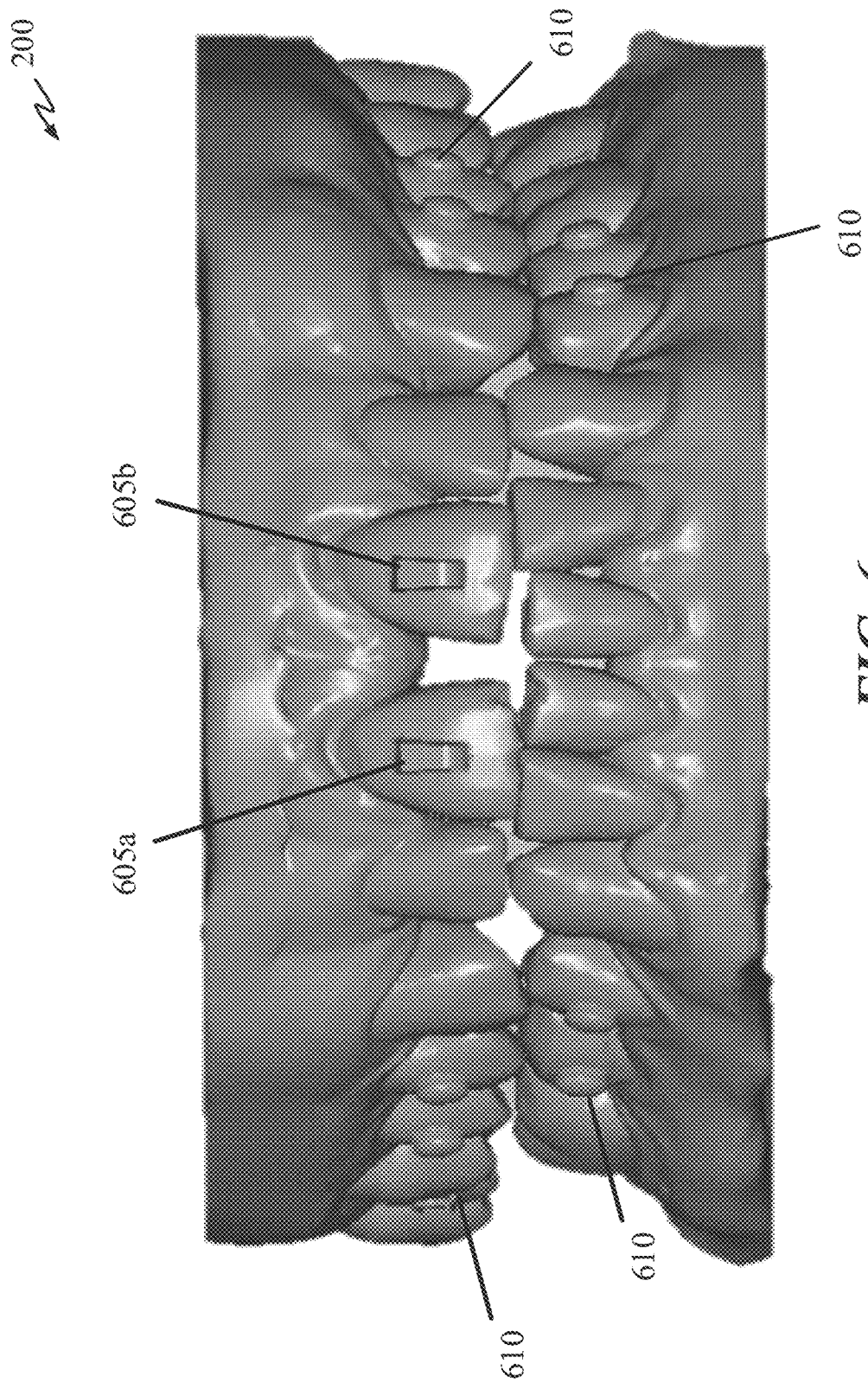
FIG. 6 is a front view of a digital model of the patient's dentition with anchoring brackets and buttons in accordance with some embodiments of the present disclosure.
Figure 7:
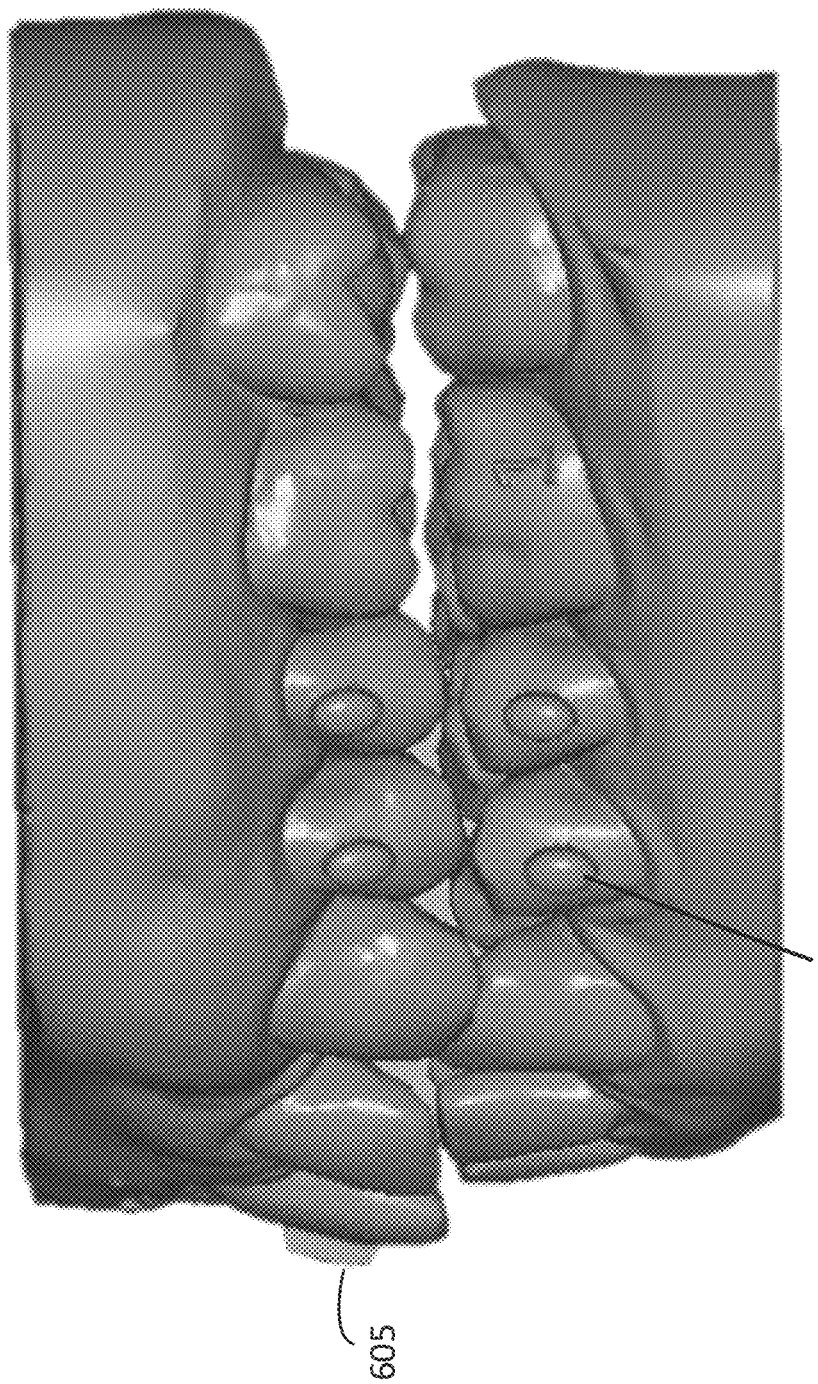
FIG. 7 is a side view of a digital model of the patient's dentition with anchoring brackets and buttons in accordance with some embodiments of the present disclosure.

FIG. 6 is a front view illustrating a patient's dentition model 200 having a plurality of anchoring locations 605 and 610. FIG. 7 is a side view of the dentition model 200 of FIG. 6. As previously mentioned, dentition model 200 is the starting dentition model obtained by directly scanning the patient's dentition using an intraoral scanner or by indirectly scanning one or more dental impressions of the patient's dentition. To prep the patient for orthodontic treatment, the orthodontist must determine the anchoring positions on the patient's teeth. As shown, dentition model 200 includes two attachments 605a and 605b on the central incisors of the upper jaw. It should be noted that attachments can also be placed on lateral incisor and/or canine tooth. Dentition model 200 also includes a plurality of anchoring buttons 610 on the first and second premolars of both the upper and lower jaws. Attachments 605 and buttons 610 can be secured to the surface of each tooth using dental cement or adhesive. In some embodiments, an anchoring attachment or button can also be placed on the first and/or second molar, depending upon the treatment plan and the patient's dentition.

Figure 8:
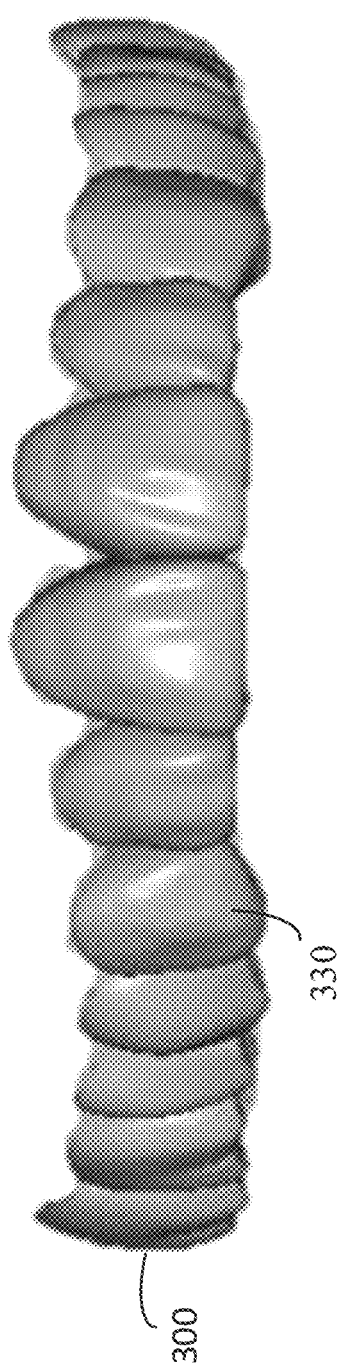
FIG. 8 is a front view of an upper esthetic aligner in accordance with some embodiments of the present disclosure.
Figure 9:
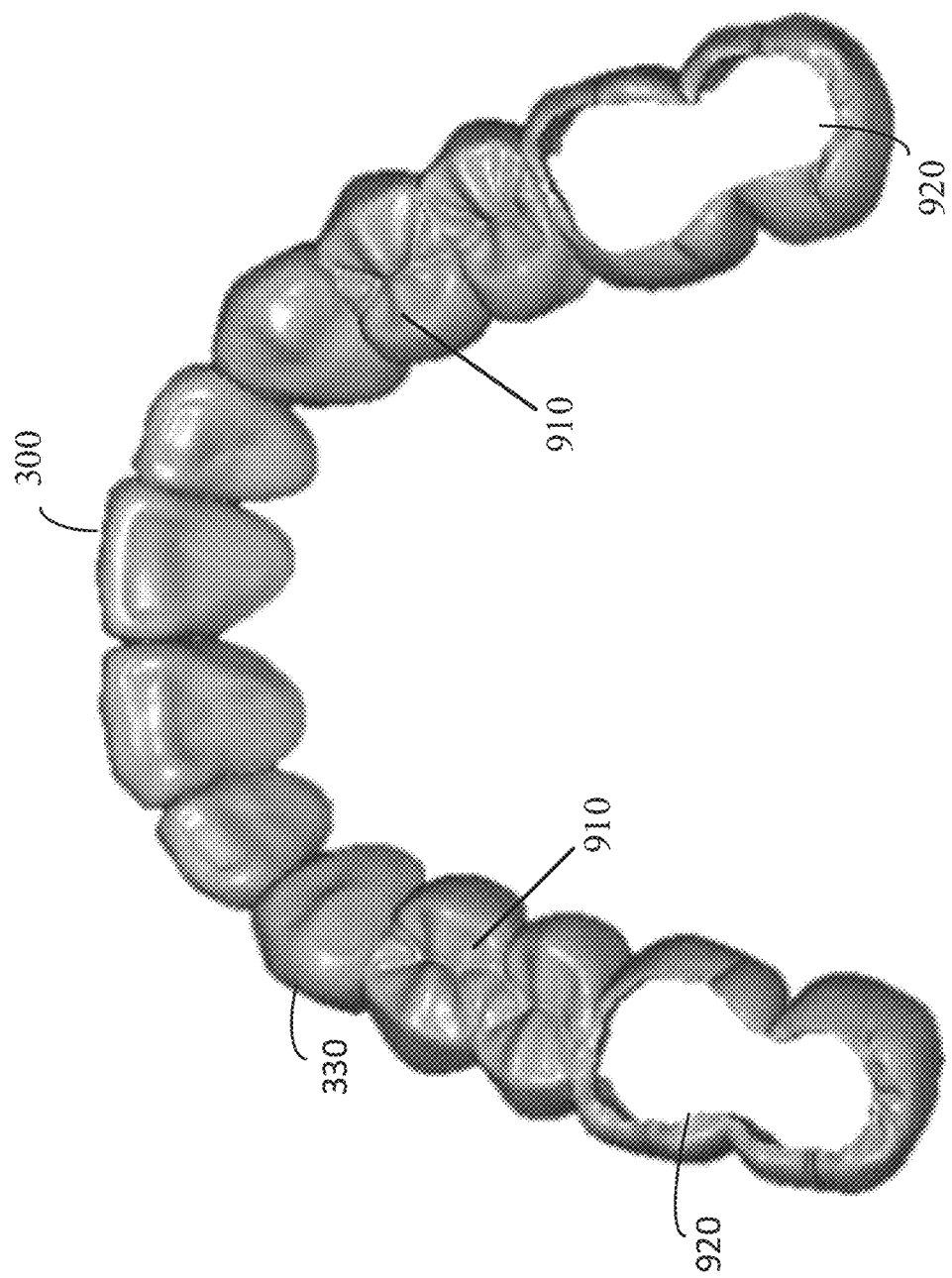
FIG. 9 is a view from the lower jaw looking up toward the upper jaw of an upper esthetic aligner with occlusal windows in accordance with some embodiments of the present disclosure.
Figure 10:
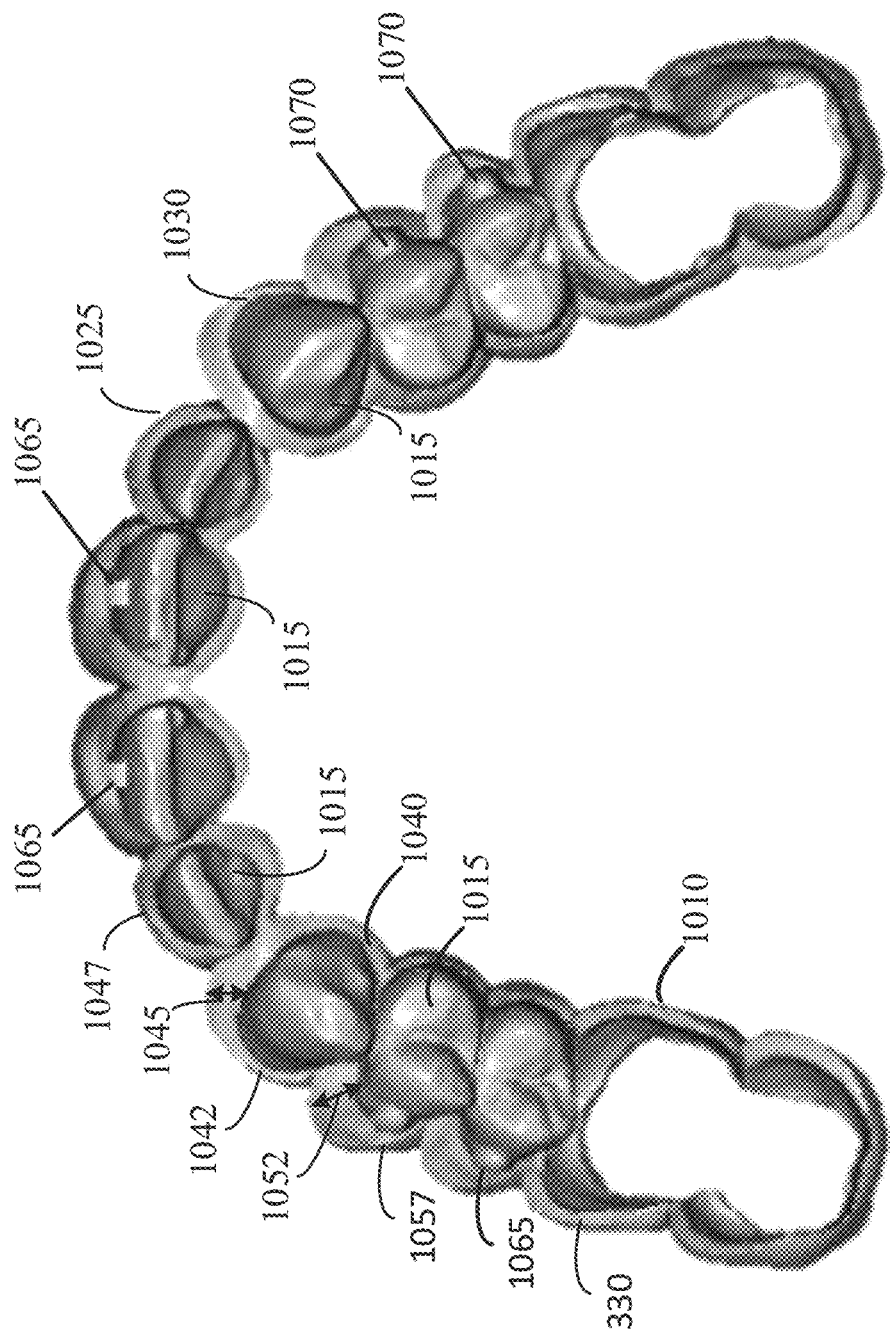
FIG. 10 is a view from the upper jaw looking down toward the lower jaw of an upper esthetic aligner with occlusal windows in accordance with some embodiments of the present disclosure.

FIG. 8 is a front view of upper esthetic aligner 300 by itself (not being donned). FIG. 9 is a bottom view (from the lower jaw looking up) of upper esthetic aligner 300 shown in FIG. 8 in accordance with some embodiments of the present disclosure. FIG. 10 is a top view (looking down from the upper jaw toward the lower jaw) of upper esthetic aligner 300 shown in FIG. 8 in accordance with some embodiments of the present disclosure. FIGS. 8-10 will not be discussed concurrently. Upper esthetic aligner 300 includes outer layer 330 having the set of simulated teeth, which can optionally include two central incisors, two lateral incisors, two canines, two first premolars, two second premolars, two first molars, two second molars, and two third molars. Depending upon the patient's dentition and the treatment plan, an esthetic aligner can omit one or more of the permanent teeth as listed above.

Referring to FIG. 9, upper esthetic aligner 300 can include occlusal surfaces 910 that are fabricated based on the patient's scan dentition data. Thus, occlusal surfaces 910 can accurately approximate the actual occlusal surfaces of the patient's teeth. This can improve the feel of the appliance and improve the feel of a bite. Occlusal surfaces 910 can include detailed occlusal features such as, but not limited to, cusps, grooves, fossa, and ridges. In this way, esthetic aligner 300 can look and feel like a real set of teeth.

In some embodiments, esthetic aligner 300 can include one or more occlusal windows 920. The size of each occlusal window 920 can be designed such that occlusal surface on the patient's teeth would sufficiently protrude out of occlusal window 920. In some embodiments, the last two molars on each side of the upper jaw can have an occlusal window. For example, as shown in FIG. 9, first and second molars on both the left and right side of the upper jaw can have an occlusal window. In another example, only the last molar (i.e., the second molar in FIG. 9) of an esthetic aligner can have an occlusal window.

Referring now to FIG. 10, which is a view of upper esthetic aligner 300 from the top looking down toward the lower jaw. As shown, esthetic aligner 300 includes outer shell 330, an inner shell 1010, and a plurality of cavities 1015 being defined by outer shell 330 and inner shell 1010. Stated differently, outer shell 330 is on the facial (buccal) side and inner shell 1010 is on the lingual side, both of which help define the shape of inner cavities 1015. Each simulated tooth can have an inner cavity that is fabricated to receive the corresponding tooth of the patient. For example, the entire inner cavity can be shaped to accurately mirror the entire shape of the corresponding tooth such that the inner cavity and the corresponding tooth can have tight fit when mated. For instance, simulated lateral incisor 1025 canine 1030 can be designed and fabricated to mirror the shape of the corresponding lateral incisor and canine on the patient's upper jaw. Alternatively, only a portion of each inner cavity can be shaped to accurately mirror a portion of the corresponding tooth. For example, the lingual side of the inner cavity can be designed and fabricated to accurately mirror the lingual surface of the corresponding tooth. In this example, the facial side of the inner cavity can be made larger than the facial side of the corresponding tooth to accommodate for an anchoring attachment/button.

In some embodiments, a portion of the inner cavity can have a slot 1065 configured to receive anchoring attachment 605 or button 610 disposed on the corresponding tooth. Slot 1065 can be designed and fabricated to have a tight fit with attachment 605 or button 610 when the esthetic aligner is worn. One or more of inner cavities 1015 can also be designed and fabricated to incrementally move the corresponding teeth in a certain direction by constantly applying a small force on the targeted teeth.

The thickness of outer shell 330 or inner shell 110 can vary at one or more portions of esthetic aligner 300. In some embodiments, the thickness of the shell can vary within a tooth. For example, at simulated canine 1040, the thickness at location 1045 can be substantially thicker than the thickness at location 1042. In some embodiments, the thickness of outer shell 330 within a tooth can be adjusted to compensate and/or to hide malocclusions such as, but not limited, gaps, crooked tooth, and misalignment. Referring again to simulated canine 1040, the thickness at location 1045 is substantially increased in order to hide a large gap that would otherwise be visible between the corresponding canine 1040 and lateral incisor 1047 had the simulated teeth have the same geometry as the corresponding real teeth. Similarly, the thickness of outer shell 330 at location 1052 of first premolar 1055 can be thicker than the thickness of outer shell 330 at location 1057. The extra thickness at 1052 can be added to the simulated tooth in order to compensate for one or more defects tooth such as a gap, a misalignment, or an underbite in the corresponding real tooth.

The thickness at locations 1045 and 1052 can be accurately designed during the design stage (using design module 110) of the esthetic aligner. But the accurate thickness control within the small localized area (e.g., a single tooth) can only be realized efficiently and economically using a 3D printing process. As previously explained, conventional aligners are formed using thermoforming manufacturing process that does not allow a way to accurately control and fabricate the thickness of a small area (e.g., within a facial surface of a tooth). Arguably, an injection molding process could be employed to vary the thickness of the outer shell of a single tooth. But that would require a very complex mold. In addition, a new mold is required for each esthetic aligner in series of esthetic aligners. For a typical treatment, that would require 20-25 different molds. Accordingly, an injection molding process would be very inefficient and prohibitively expensive. Whereas, the additive manufacturing process only requires a digital esthetic aligner model in order to fabricate the physical model. Thus, system 100 can efficiently generate many different digital esthetic aligner models and fabricate corresponding physical models without the need to create any physical mold.

Figure 11A:
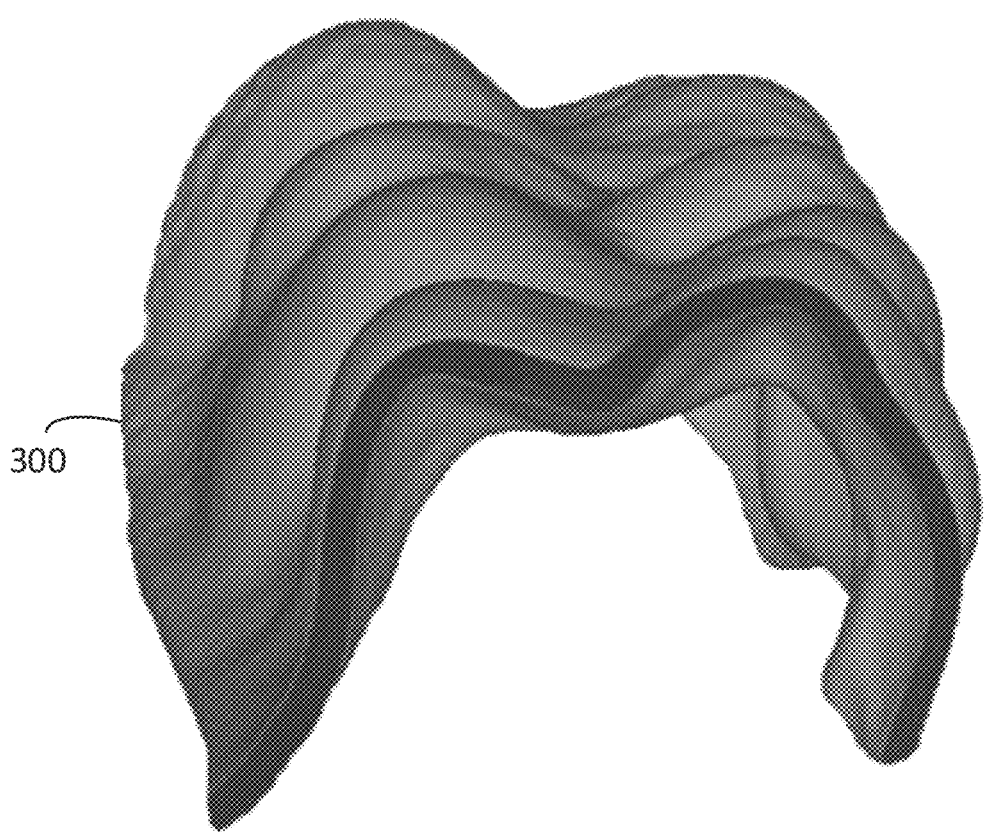
FIGS. 11A and 11B are side cut out views of an esthetic aligner in accordance with some embodiments of the present disclosure.
Figure 11B:
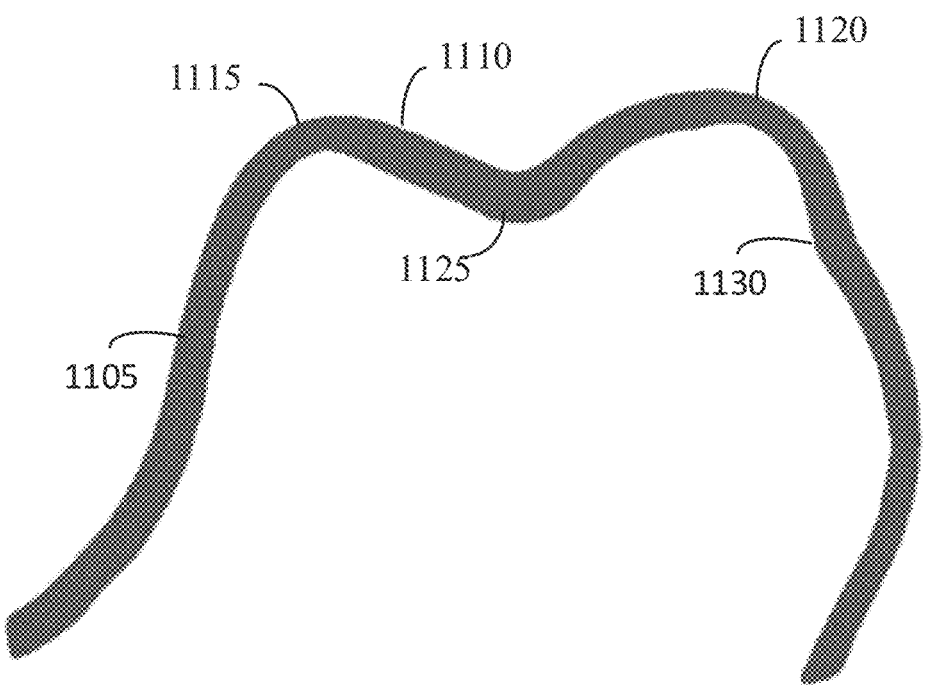

FIG. 11A illustrates a perspective side view of a portion of esthetic aligner 300. FIG. 11B is a side view of an end portion of the esthetic aligner shown in FIG. 11A. FIG. 11B shows the general contour of a shell 1105 having an occlusal surface 1110. As shown shell 1105 has different thickness at various portions shell 1105. For example, at locations 1115 and 1120, the thickness of shell 1105 is thinner than the thickness at locations 1125 and 1130, which may have a thicker shell to compensate and/or hide a malocclusion.

Figure 12:
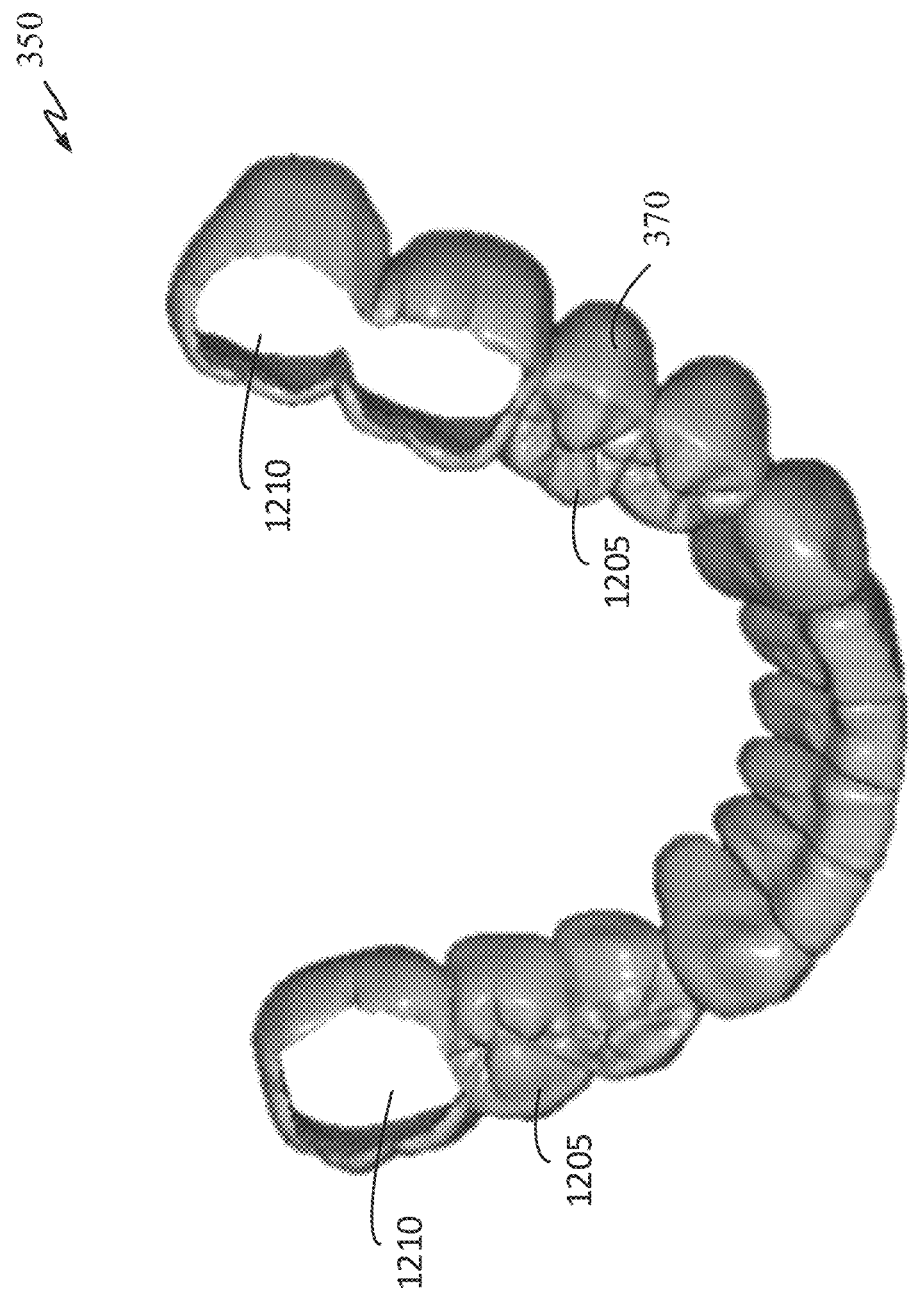
FIG. 12 is a perspective view of a lower esthetic aligner in accordance with some embodiments of the present disclosure.
Figure 13A:
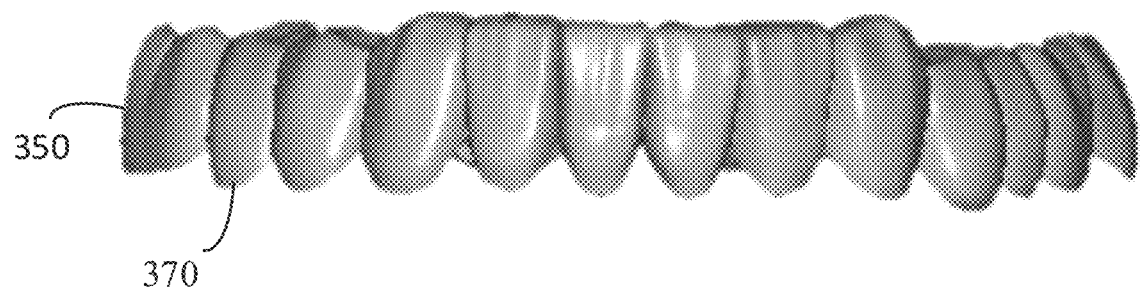
FIGS. 13A and 13B are front and back views of a lower esthetic aligner in accordance with some embodiments of the present disclosure.
Figure 13B:
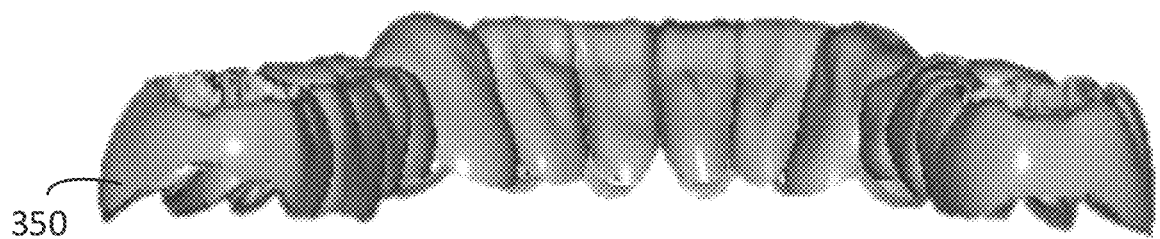

FIG. 12 is a perspective view of esthetic aligner 350, which is an esthetic aligner for the lower jaw. FIG. 13A is a front view of esthetic aligner 350 shown in FIG. 12, and FIG. 13B is the back view of the same esthetic aligner 350. Similar to esthetic aligner 300, esthetic aligner 350 can include detailed occlusion surfaces 1205 and occlusion windows 1210. Esthetic aligner 350 also includes outer shell 370 with simulated teeth that approximate the patient's teeth at a certain stage of the treatment plan. For example, the simulated teeth can approximate the patient's teeth arrangement near or at the end of the treatment plan. Alternatively, the simulated teeth can approximate the patient's teeth arrangement at any beginning or intermediate stage of the treatment plan. In this way the patient's appearance does not change dramatically over a short period of time.

Figure 14:
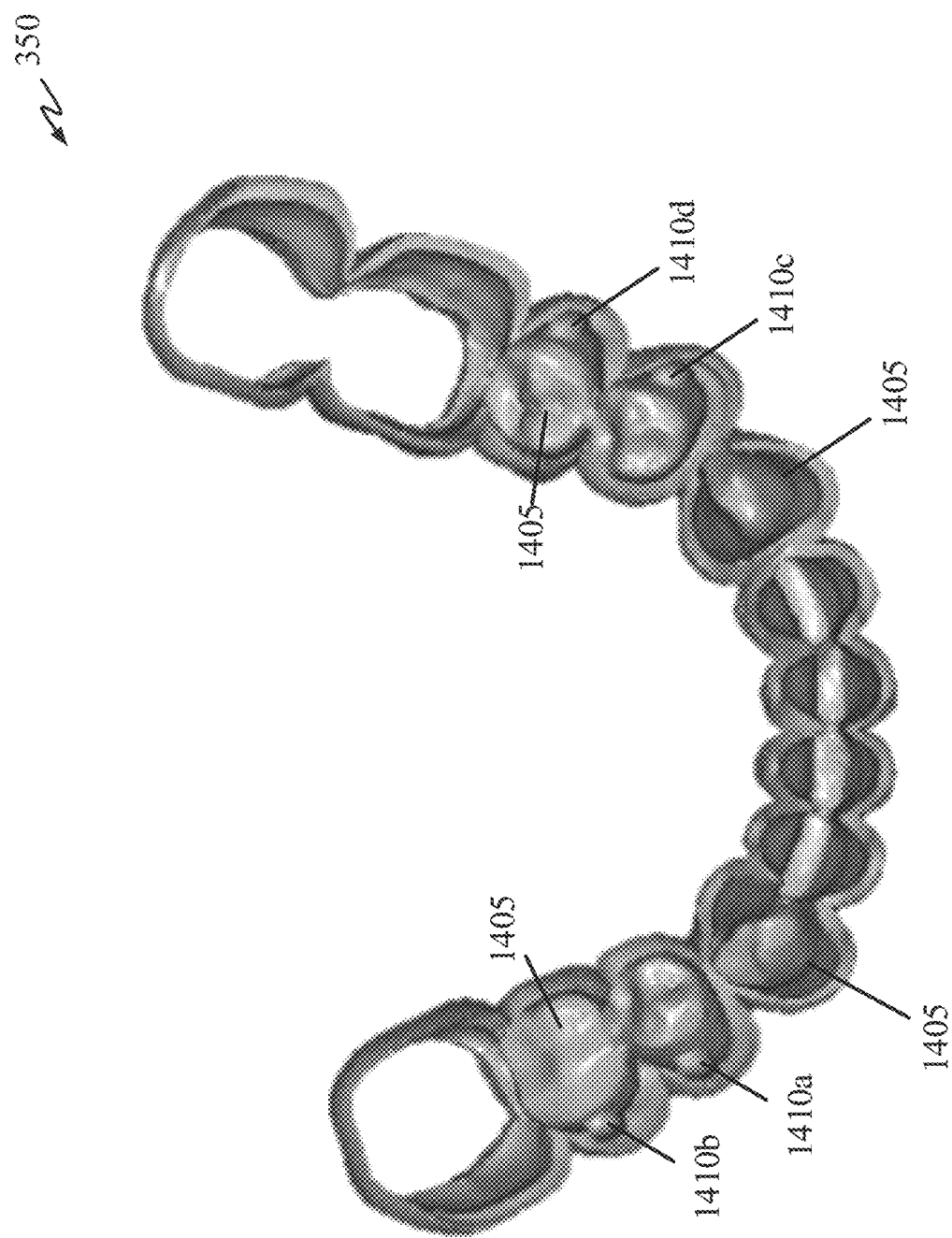
FIG. 14 is a perspective view (from the back side) of a lower esthetic aligner in accordance with some embodiments of the present disclosure.

FIG. 14 is a perspective view of esthetic aligner 350 from the bottom side of the aligner. Esthetic aligner 350 can have the same features and functionalities as esthetic aligner 300 as described above. As shown, esthetic aligner 350 includes inner cavities 1405 and anchoring slots 1410. Inner cavities 1405 can have the same features and functionalities as the inner cavities of esthetic aligner 300. Anchoring slots 1410 can be disposed on larger teeth such as premolars and molars. Anchoring slots 1410 are disposed on the facial side of an inner cavity and are configured to receive anchors located on the corresponding real teeth of the patient. In some embodiments, anchoring slots 1410 can be disposed on the lingual side of the inner cavity. In this embodiment, the corresponding anchors on the patient's teeth are disposed on the lingual side of each tooth.

As shown, anchoring slots 1410a and 1410c are both located on the first premolars of the lower jaw. Anchoring slot 1410a is configured to receive and mate with an anchoring button/attachment on the corresponding first premolar of the patient's lower jaw. Similarly, anchoring slot 1410b is configured to receive and mate with an anchoring button/attachment on the corresponding first premolar on the other side of the jaw.

Figure 15A:
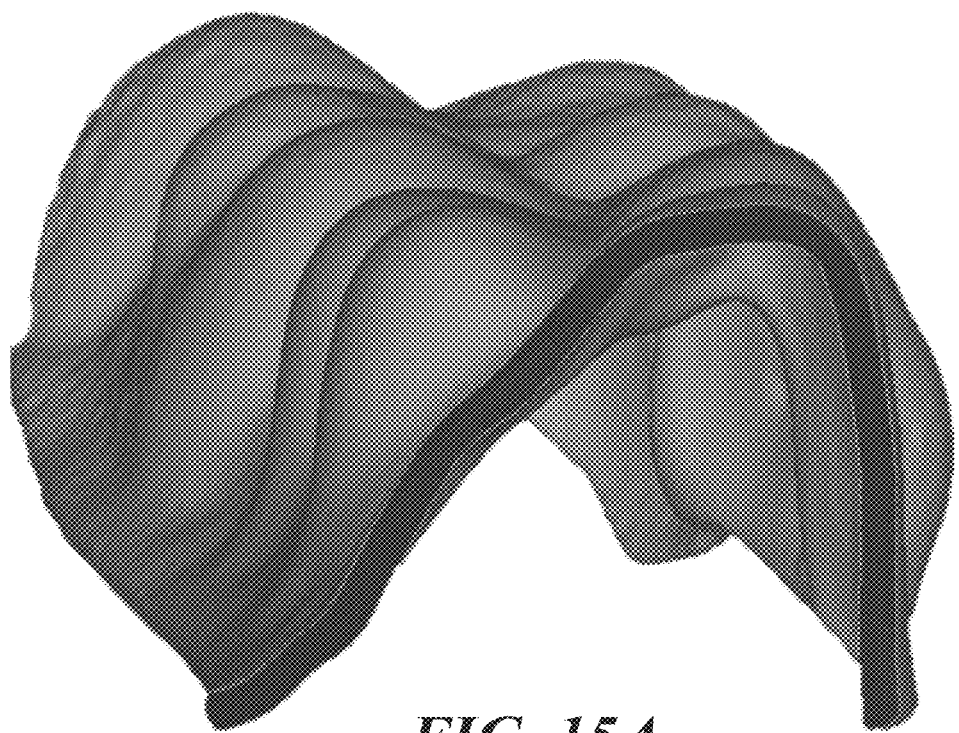
FIGS. 15A and 15B are side cut out views of an esthetic aligner in accordance with some embodiments of the present disclosure.
Figure 15B:
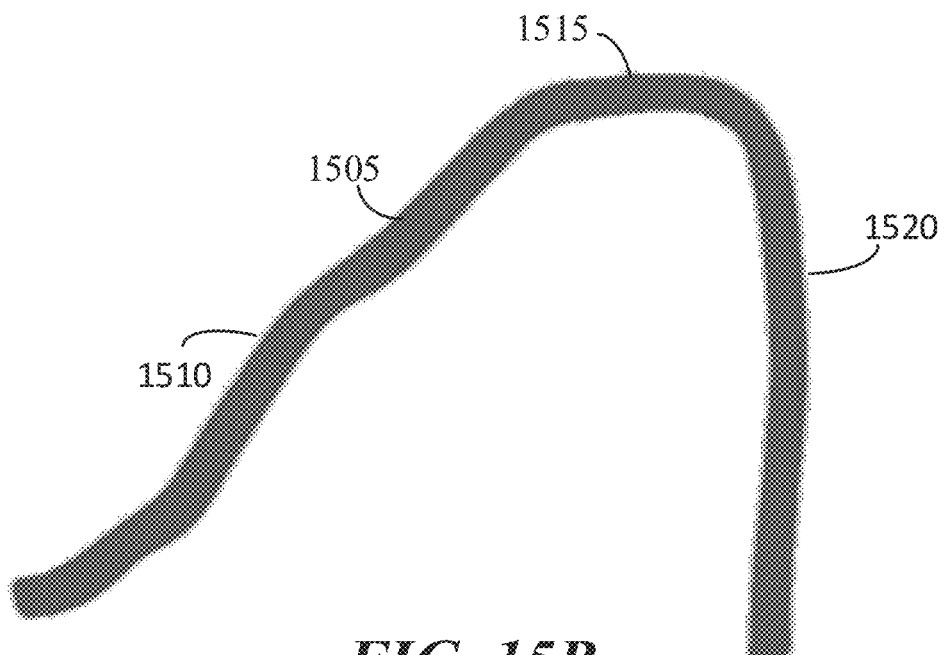

FIG. 15A is a side perspective view of a portion of esthetic aligner 350. FIG. 15B is a cross-sectional profile of an end portion of the esthetic aligner 350 shown in FIG. 15A. Esthetic aligner 350 includes an outer shell 1505, which has a lingual surface 1510, an occlusal surface 1515, and a facial surface 1520. With 3D printing, esthetic aligner 350 can be made with different materials as a single integrated unit. For example, the lingual side of outer shell 1505 (including lingual surface 1510) can be fabricated with a different material than the facial side of outer shell 1505. In another example, occlusal surface 1515 can be made with a tougher material to deliver better chip resistance and chewing functionalities.

Figure 16B:
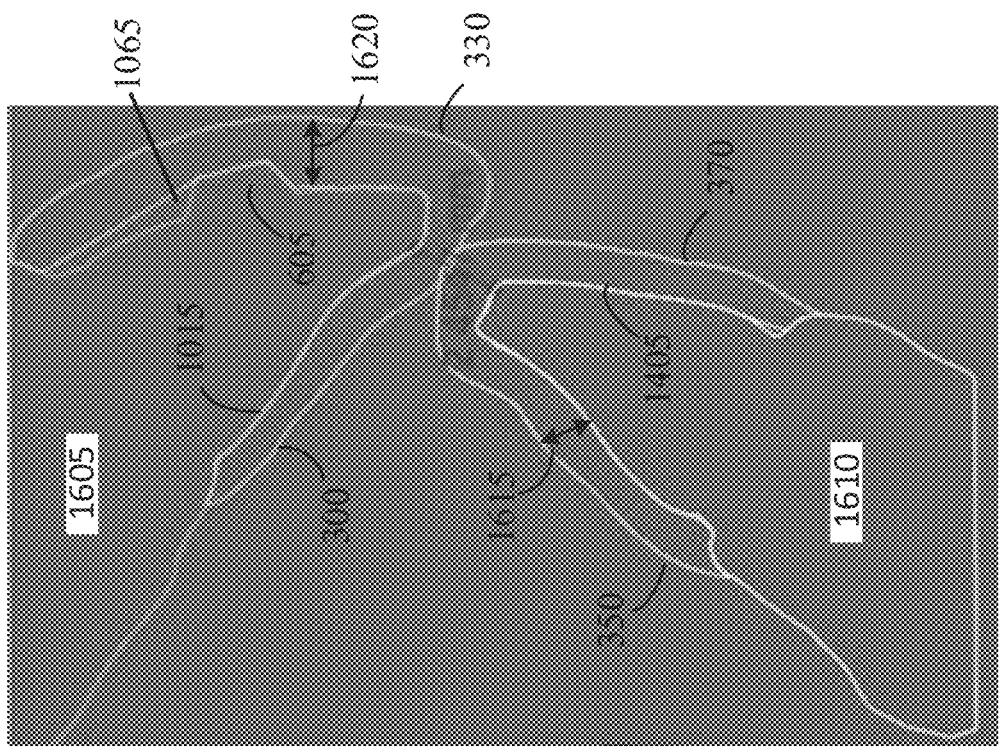
FIG. 16B is a cut out view at line 1602 of FIG. 16A.
Figure 16A:
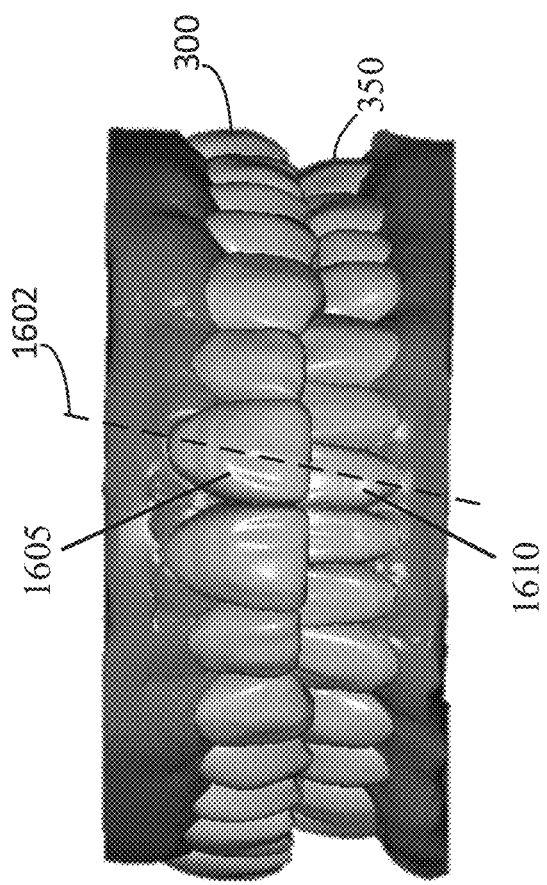
FIG. 16A is a front view of a digital model of upper and lower esthetic aligners (as being worn) in accordance with some embodiments of the present disclosure.

FIG. 16A is a front view of esthetic aligners 300 and 350 being worn by a patient. FIG. 16B is side cut view at line 1602 illustrating how esthetic aligners 300 and 350 are fitted over the patient's teeth. As shown in FIG. 16B, esthetic aligner 300 is fitted over central incisor 1605, and esthetic aligner 350 is fitted over central incisor 1610. To enable a good fit, inner cavity 1405 is shaped to mirror the shape of incisor 1610. Also shown is the variable thickness of the shell of the esthetic aligner. For example, the thickness of outer shell 370 at location 1615 is thicker than other areas of outer shell 370.

Incisor 1605 includes attachment 605, which is fitted into anchoring slot 1065 of inner cavity 1405. As shown, inner cavity 1405 is designed to mirror the lingual surface of incisor 1605 but only a portion of the facial surface is mirrored because of the presence of attachment 605. Additionally, outer shell 330 can have a larger thickness at location 1620 right below where anchoring slot 1065 is mated with attachment 605 on incisor tooth 1605. The thickness can have a range of from 0.5 mm to 20 mm, such as from 0.5 mm to 10 mm, such as from 1 mm to 10 mm, such as from 1 mm to 5 mm.

Figure 17:
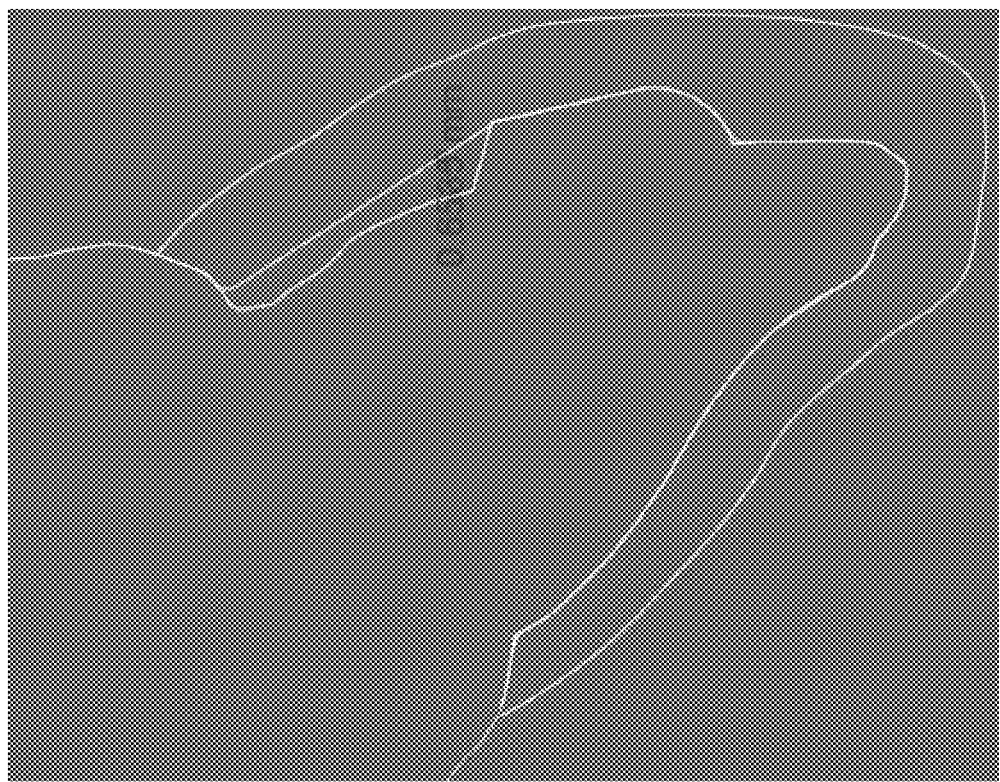
FIG. 17 is a cut out view of an esthetic aligner installed on a tooth structure in accordance with some embodiments of the present disclosure.

FIG. 17 is a side cutout view of esthetic aligner 300 being mounted on a tooth with an anchoring button or attachment. Esthetic aligner 300 includes locations of varying thicknesses designed to fortify the structural integrity of the aligner and/or to impart an overall force on the tooth in a certain direction.

Figure 18:
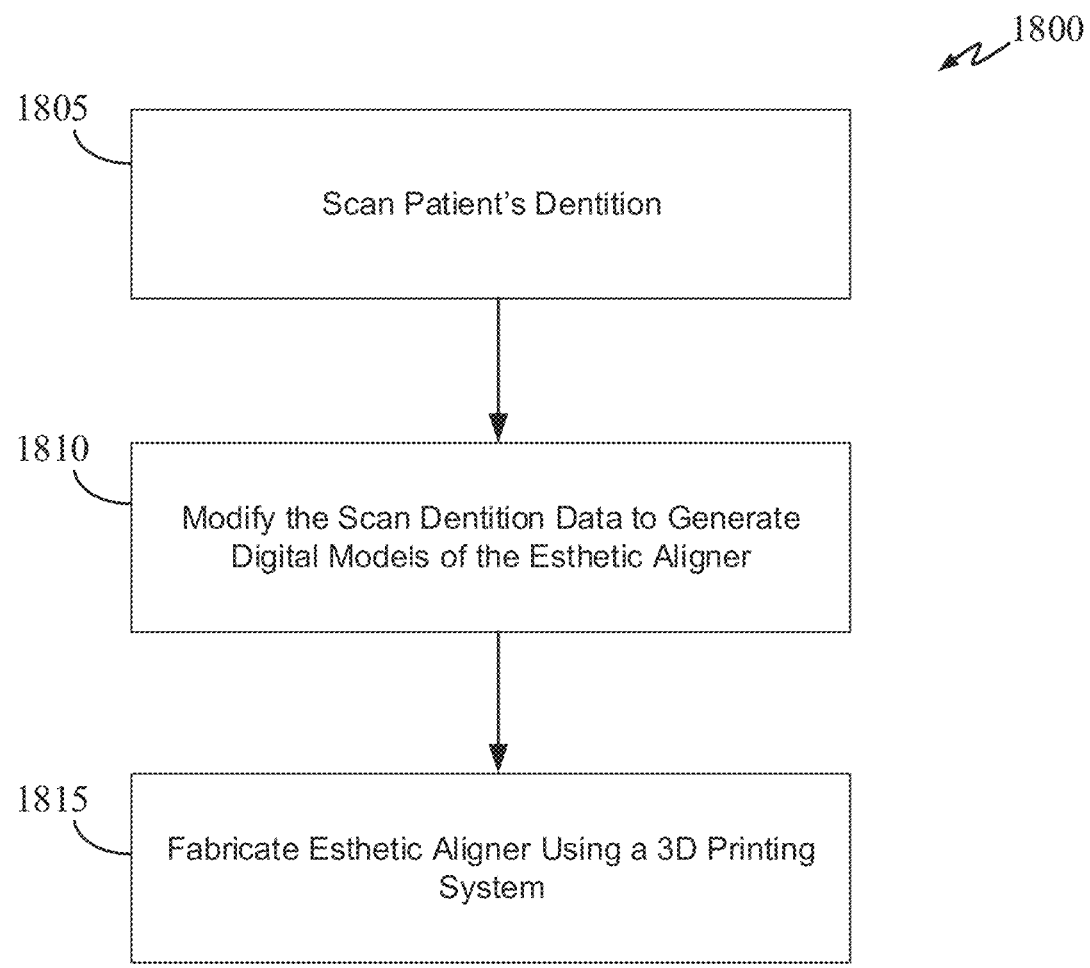
FIG. 18 is a flow chart of a process for designing and fabricating an esthetic aligner in accordance with some embodiments of the present disclosure.

FIG. 18 is a flow chart of a process 1800 for designing and fabricating a plurality of esthetic aligners 300 in accordance with some embodiments of the present disclosure. Process 1800 starts at subprocess 1805 where the patient's scan dentition data is generated by scanning one or more of the patient's dental impressions. Alternatively, a direct intraoral scan of the patient's mouth can be performed. Once the patient's scan dentition data is obtained, it can be uploaded to the design module 110 where it is modified to generate a plurality of digital esthetic aligner models, in accordance with a treatment plan. Each digital model includes an outer shell (e.g., shells 330 and 370) with simulated teeth that approximate the patient's dentition and an inner cavities (e.g., 1080) that is configured to impart a force on the patient's teeth in a particular direction. At 1815, a plurality of esthetic aligners is fabricated using an additive manufacturing system, such as a 3D printer. Each esthetic aligner is fabricated based on its respective digital model generated at subprocess 1810. In some embodiments, the simulated teeth on the outer shell of the esthetic model can be additively manufactured (e.g., 3D printed) using a different material than material used to print the inner cavities.

Figure 19A:
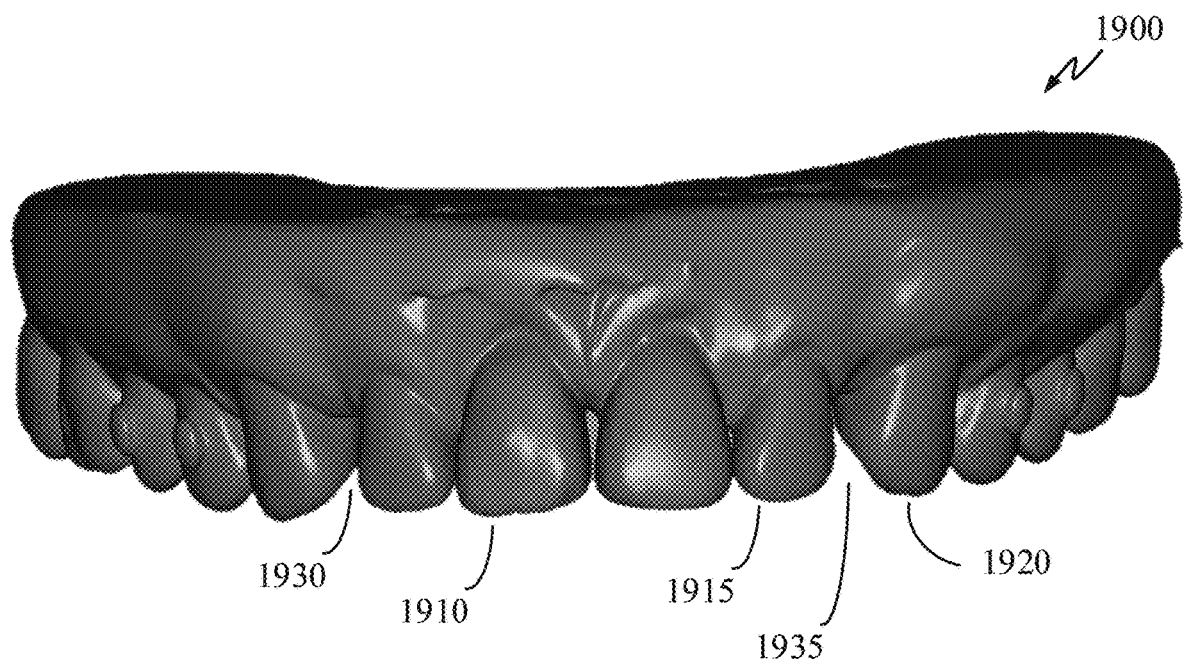
FIG. 19A is a front view of a patient's upper jaw after undergoing a treatment plan using one or more esthetic aligners.

FIG. 19A illustrates a scanned model 1900 of a patient's upper jaw after completing a treatment plan using a series of esthetic aligners. As shown, the final arrangement of the patient's dentition is orthodontically good (or even perfect). However, without the esthetic aligner in place, the true shape and size of the patient's teeth are exposed, which can be esthetically imperfect. For example, a tooth can have a strange shape and/or size even though it is perfectly straight and aligned with adjacent teeth. Accordingly, after the treatment plan is completed, a veneer can be installed to provide the patient with a perfect looking set of teeth.

Figure 19B:
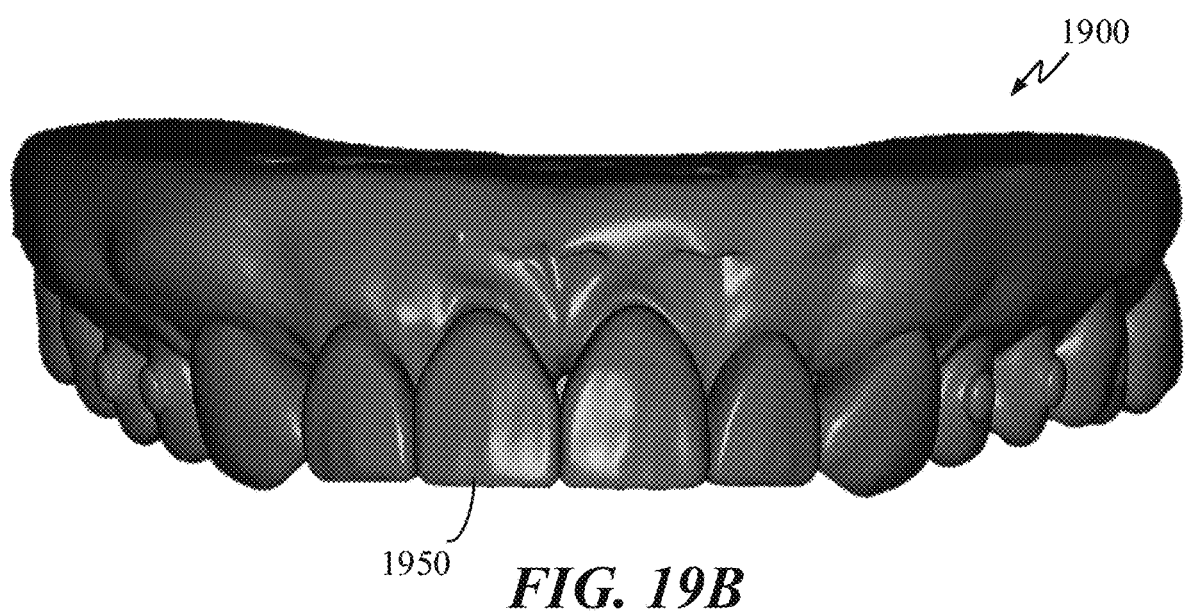
FIG. 19B is a front view of the patient's upper jaw in FIG. 19A but with a veneer installed in accordance with some embodiments of the present disclosure.

FIG. 19B illustrates scanned model 1900 with a veneer 1950 installed. As shown, veneer 1950 is designed to hide esthetic imperfection of teeth 1910, 1915, and 1920, which are teeth with odd shapes and/or sizes. As shown in model 1900, teeth naturally have open contacts therebetween. However, some open contacts can be esthetically unpleasant, which can only be covered using a veneer. In some embodiments, the treatment plan can include the process of moving one or more teeth to achieve open contacts of a certain size such that an ideal veneer for that particular patient can be also designed and included at the onset of the treatment. For example, subprocess 1810 of process 1800 can take the final size of open contacts 1930 and 1935 into consideration when designing one or more esthetic aligners in the series. Referring to FIG. 19A, the resulting locations and sizes of open contacts 1930 and 1935 are achieved purposefully to allow space for veneer 1950 to be perfectly fitted.

Figure 19C:
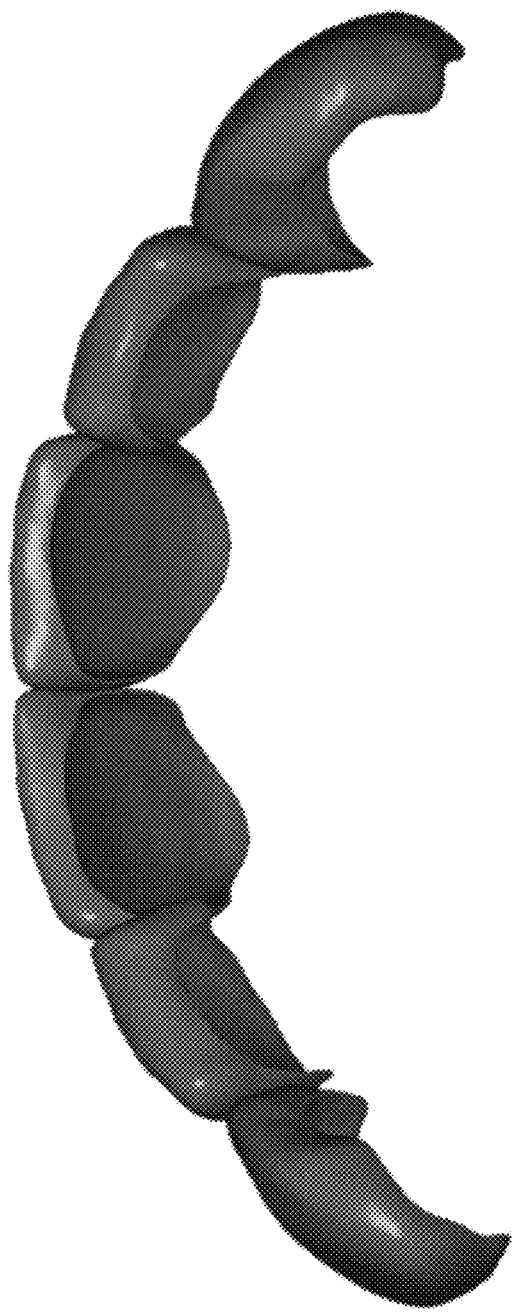
FIG. 19C is a top view of the veneer in FIG. 19B.

FIG. 19C is a top view of veneer 1950, which has been designed at the onset of the treatment plan. Veneer 1950 can be designed to be fitted into the patient's final teeth arrangement. Because veneer 1950 is part of the treatment plan, the patient's final teeth arrangement can be appropriately designed to fit an ideal veneer for the patient. In this way, after the very last esthetic aligner is removed, veneer 1950 can be installed without requiring further scanning of the patient's final dentition and further designing and fabrication of the veneer. In some embodiments, subprocess 1810 includes designing one or more esthetic aligners to move one or more teeth to achieve a final teeth arrangement having open contacts of a certain shape and size. In this way, an ideal veneer for that particular patient can be also designed and fabricated at subprocess 1815.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. An orthodontic dental appliance for improving teeth appearance and repositioning of the teeth, the appliance comprising:
   an outer shell with simulated teeth that approximate a desired teeth arrangement;
   inner cavities configured to receive a patient's teeth and to incrementally reposition the teeth toward the desired teeth arrangement; and a plurality of anchoring slots in the inner cavities adapted to receive corresponding anchors on the patient's teeth, with the dental appliance including a region of increased dental appliance wall thickness proximate to a location of at least one anchoring slot that imparts an increased stiffness to the region.

2. The appliance of claim 1, wherein the desired teeth arrangement comprises a teeth arrangement that approximates the appearance of teeth at a final stage of the patient's treatment plan.

3. The appliance of claim 1, wherein the desired teeth arrangement comprises a teeth arrangement that approximates the appearance of teeth at any stage of the patient's treatment plan.

4. The appliance of claim 1, wherein the desired teeth arrangement comprises a teeth arrangement with no visible dentition defect.

5. The appliance of claim 1, further comprising one or more occlusal windows configured to expose an occlusal surface of one or more teeth.

6. The appliance of claim 1, wherein the outer shell comprises one or more areas having varying thicknesses configured to compensate for a dentition defect.

7. The appliance of claim 6, wherein the dentition defect comprises one or more of an enamel defect, a gap between two teeth, a chipped tooth, and a gap caused by a crooked tooth.

8. The appliance of claim 1, the outer shell comprises one or more simulated teeth having varying thickness within a tooth to compensate for a dentition defect or an anchor on the tooth.

9. The appliance of claim 1, wherein the outer shell comprises one or more simulated teeth with an occlusal surface that comprises one or more cusps, grooves, fossa, or ridges.

10. The appliance of claim 1, wherein the inner cavities comprises one or more under-hook features to partially mate with an anchor on a tooth.

11. The appliance of claim 1, wherein the outer shell and a wall of the inner cavities comprise different materials.

12. The appliance of claim 1, wherein the final teeth arrangement comprises a teeth arrangement specifically designed for fitting a veneer.

13. The appliance of claim 1, wherein the region of increased dental appliance wall thickness proximate to a location of at least one anchoring slot has a wall thickness in a range of from 0.5 mm to 20 mm.

14. The appliance of claim 1, wherein the region of increased dental appliance wall thickness proximate to a location of at least one anchoring slot has a wall thickness in a range of from 0.5 mm to 10 mm.

15. The appliance of claim 1, wherein the region of increased dental appliance wall thickness proximate to a location of at least one anchoring slot has a wall thickness in a range of from 1 mm to 20 mm.

16. The appliance of claim 1, wherein the region of increased dental appliance wall thickness proximate to a location of at least one anchoring slot has a wall thickness in a range of from 1 mm to 5 mm.

* * * * *